(12) United States Patent
Hong

(10) Patent No.: US 6,281,838 B1
(45) Date of Patent: Aug. 28, 2001

(54) BASE-3 SWITCHED-LINE PHASE SHIFTER USING MICRO ELECTRO MECHANICAL (MEMS) TECHNOLOGY

(75) Inventor: John H. Hong, Thousand Oaks, CA (US)

(73) Assignee: Rockwell Science Center, LLC, Thousand Oaks, CA (US)

(*) Notice: Subject to any disclaimer, the term of this patent is extended or adjusted under 35 U.S.C. 154(b) by 0 days.

(21) Appl. No.: 09/302,533

(22) Filed: Apr. 30, 1999

(51) Int. Cl.$^7$ ................................ H01Q 3/36; H01Q 3/38
(52) U.S. Cl. .................... 342/371; 342/374; 342/377; 333/139; 333/164
(58) Field of Search ......................... 342/368, 375, 342/133, 369–374, 376, 377; 333/156–164, 138–155; 327/231–260, 261–290; 332/105

(56) References Cited

U.S. PATENT DOCUMENTS

| | | | |
|---|---|---|---|
| 2,407,169 | * 9/1946 | Loughren | 342/133 |
| 3,781,722 | * 12/1973 | Pierson | 333/156 |
| 4,649,393 | 3/1987 | Rittenbach | 342/371 |
| 5,424,696 | * 6/1995 | Nakahara et al. | 333/156 |
| 5,578,976 | 11/1996 | Yao . | |
| 5,646,568 | * 7/1997 | Sato | 327/276 |
| 6,091,311 | * 7/2000 | Waters | 333/161 |

OTHER PUBLICATIONS

M.I. Skolnik, "Radar Handbook"; McGraw–Hill Book Company; New York, 1980 (second edition); pp. 286–288.*
Skolnik, "Phased Array Radar Antennas", Radar Handbook, Second Edition, pp. 7.63–7.68, (1990); McGraw–Hill; New York.

* cited by examiner

Primary Examiner—Bernarr E. Gregory
(74) Attorney, Agent, or Firm—Koppel & Jacobs

(57) ABSTRACT

A phased array antenna phase shifter having one or more serially connected stages, the stages allowing a transmission signal to pass through to a radiating element. Each of the stages have three or more delay lines for imparting a different respective delay on the transmission signal and a network of switches to select which of the delay lines within the stage will carry the transmission signal. As the signal is passed through each of the stages, the signal will experience the cumulative delays from the stages of the phase shifter. The delay lines in each stage comprise delay lines of different respective lengths, a delay is imparted on the transmission signal as it passed along the length of the selected delay line. The network of switches comprises micro electromechanical systems (MEMS) switches.

9 Claims, 5 Drawing Sheets

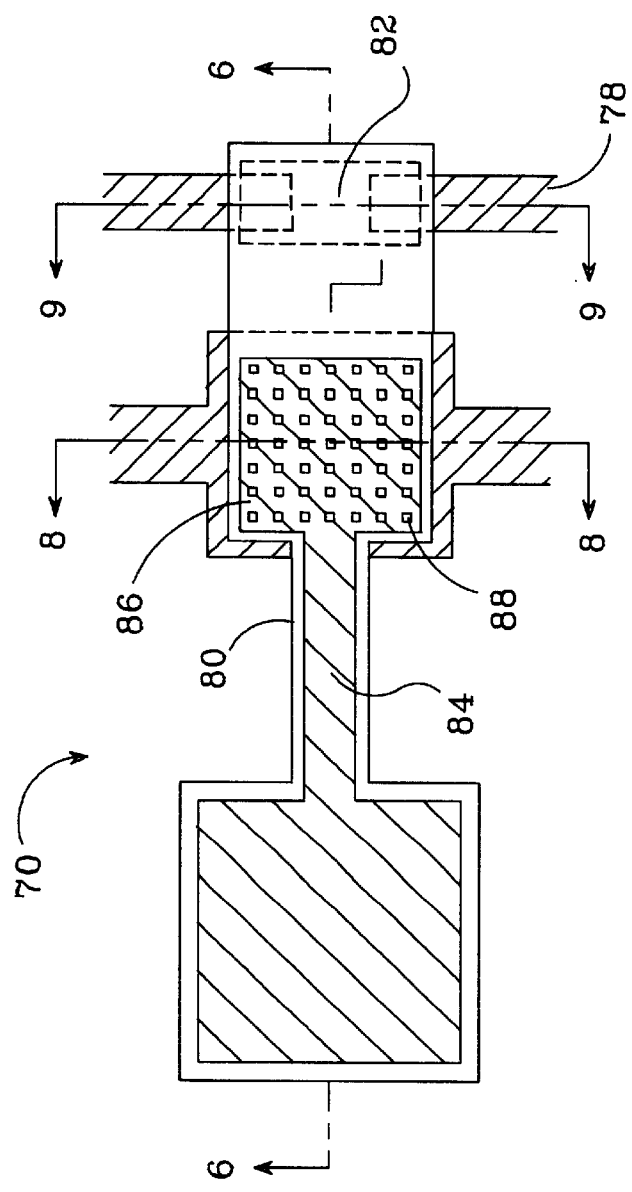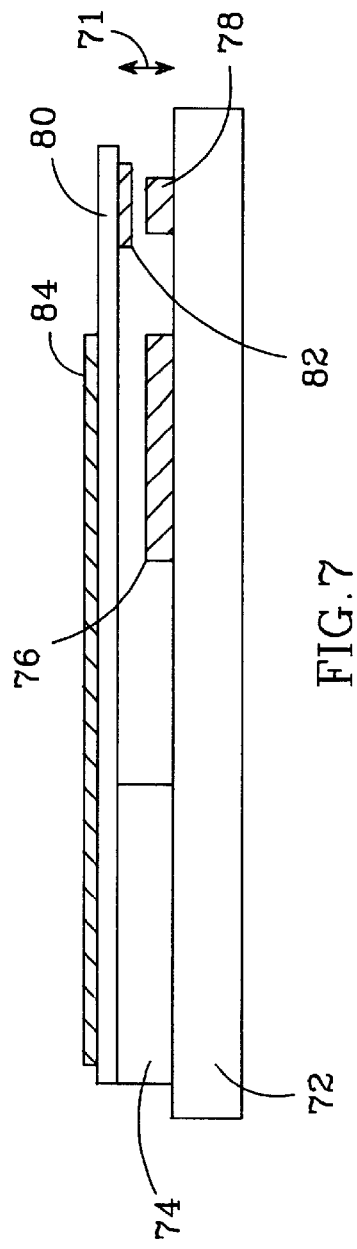
FIG.6
FIG.7

BASE-3 SWITCHED-LINE PHASE SHIFTER USING MICRO ELECTRO MECHANICAL (MEMS) TECHNOLOGY

BACKGROUND OF THE INVENTION

1. Field of the Invention

This invention relates to phased array antenna phase shifters and more particularly to a select-line, base-3 phase shifter using micro electro mechanical system (MEMS) technology.

2. Description of the Related Art

Phased array antennas comprise multiple radiating elements whose transmission signals combine during operation to yield superior results over a single element antenna. The transmission signals of the multiple radiating elements are typically phased and summed during transmission to yield a synthesized transmission beam. The resulting transmission beam contains the combined power of all the multiple radiating elements and provides a single agile and inertialess beam that is useful in many applications, including radar and communication.

During operation of a phased array antenna, it is useful to steer the phased array transmission beam. Often the steering of the transmission beam is implemented by mechanical means using a gimbaled system to physically turn the phased array antenna. The transmission beam can also be steered electronically while keeping the phased array antenna in a fixed position. This is accomplished by electronically manipulating the phase of the transmission signal of each individual radiating element in the phased array antenna. The beam of a phased array antenna may be steered to an desired angle by applying a linearly progressive phase increment, or shift, from radiating element to radiating element. Electronic beam steering has advantages over a mechanically actuated system, greater reliability, more effective beam synthesizing and greater adaptation to hostile environments.

FIG. 1 is a simplified diagram of one row of a conventional phased array antenna 10 utilizing electronic beam steering, a complete planar phased array antenna having a number of such rows. Each radiating element 12 of the phased array antenna 10 has its own phase shifter 14. An input line 16 carrying a transmission signal is coupled to each phase shifter 14, which imparts a respective predetermined phase shift to the transmission signal as it passes through that phase shifter 14. The phase shifted transmission signals are then coupled to respective radiating elements 12 for transmission. Various types of phase shifters 14 have been developed, including switched-line phase shifters, reflection-line phase shifters and loaded-line phase shifters. The present invention is directed to an improvement over conventional switched-line phase shifters.

Present binary switched-line phase shifters are discussed in Skolnik, Radar Handbook, Second Edition (1990), pp. 7.63–7.68 and in U.S. Pat. No. 4,649,393 to Rittenbach. Present phase shifters have one or more serial connected stages, each stage having two delay lines of different length. As a transmission signal is passed through the respective phase shifter 14, it passes through each of the serially connected stages. One of the delay lines within each stage carries the transmission signal as it passes through the stages of the phase shifter. A phase shift is imparted to the transmission signal by a time delay which the transmission signal experiences as it passes through the delay line within each stage. The total phase shift is the accumulation of the individual time delays within each stage of the phase shifter.

FIG. 2 is a diagram of the conventional prior art base-2 phase shifter 14 having six serially connected stages 22a–f with two delay lines 24a,24b per stage. FIG. 2 further illustrates the phase shift that can be imparted by each of the stages 26a–f. In switched-line phase shifting, one delay line in each stage is dedicated to zero phase shift or zero time delay. For instance, in stage one delay line 24b is dedicated to zero phase shift. The zero phase shift delay lines in each stage allows the transmission signal to pass through each stage and the entire phase shifter without a phase shift, if desired. In prior art phase shifter 14 half of the delay lines are dedicated to zero phase shift. The greater percentage of delay lines dedicated to zero phase shift results in fewer lines dedicated to imparting phase shifts and a corresponding reduction in phase shift resolution.

The desired delay line within each stage is activated for carrying the transmission signal by closing the appropriate switches at the input and output of the desired delay line. The switch closing is generally controlled by a microprocessor over electrical control lines with either parallel or serial access to the switches. The switches could also be controlled by other modalities such as optical control.

The prior art switches include PIN diode switches and FET transistor switches. It is well known that switches of this type suffer from insertion loss dominated by the resistive loss of the signal line. Furthermore, switches characteristically reflect signals during transmission, causing signal distortion. As the transmission signal passes through each stage of the phase shifter, the transmission signal experiences loss and signal distortion from the switches within the stages. The greater the number of stages the greater the resulting loss and distortion.

SUMMARY OF THE INVENTION

The present invention provides a superior method and device for switched-line phased array antenna phase shifting, utilizing more delay lines per stage (preferably three as opposed to two). The additional delay lines per stage, provides greater phase shifting resolution using the same number of switches and reduces the transmission signal loss and distortion. A switching technology with superior insertion loss and isolation characteristics is also used.

In the preferred embodiment, a base-3 rather that base-2 selection of delay lines per stage is used. Using the same number of switches as in the past, the number of stages can be reduced. For instance, the base-3 implementation of 12 delay lines uses four stages while the prior base-2 implementation uses six stages. With the base-3 implementation, the transmission signal need only encounter four stages and eight switches during transmission as opposed to the prior art six stages and twelve switches. Thus, the loss and distortion experienced by the transmission signal is significantly reduced.

A base-3 selection of delay lines also provides for greater phase shifting resolution. In the present invention, one delay line per stage is dedicated to zero phase shift for a total of one third of the delay lines of the entire phase shifter delay lines dedicated to zero phase shift. Two thirds of the delay lines are used to impart phase shift on the transmission signal. By dedicating a greater percentage of delay lines to phase shifting, the shifting can occur in smaller increments. This allows for a greater resolution in phase shifting while using the same number of delay lines and switches as the prior art.

The base-3 selection of transmission lines can be implemented using conventional switches including PIN diode and FET transistor switches. In the preferred embodiment, the switches within each phase shifter are fabricated using micro electro mechanical system (MEMS) technology, providing superior isolation and insertion loss characteristics. Each switch comprises a micro fabricated, miniature electro mechanical RF switch capable of handling signal frequencies greater than a Ghz while maintaining minimal insertion loss in the "ON" state and excellent electric isolation in the "OFF" state. Each MEMS switch is formed on a semi-insulating substrate and includes a cantilever arm that is affixed to the substrate and extends over a ground line, and a gapped signal line formed by metal microstrips on the substrate. An electrical contact is formed on the bottom of the cantilever arm positioned above and facing the gap in the signal line. A top electrode on the cantilever arm forms a capacitor structure above the ground line on the substrate. The switch is actuated by application of a voltage to the top electrode. With voltage applied, electrostatic forces attract the capacitor structure toward the ground line, thereby causing the metal contact to close the gap in the signal line and thus close the switch.

These and other features and advantages of the invention will be apparent to those skilled on the art from the following detailed description of preferred embodiments, taken together with the accompanying drawings.

BRIEF DESCRIPTION OF DRAWINGS

FIG. 6 is a top plan view of a micro electro mechanical switch of the present invention.

FIG. 7 is a cross section of the switch in FIG. 6 taken along the section line 7—7.

DETAILED DESCRIPTION OF THE INVENTION

The present invention comprises a phased array antenna phase shifter with one or more stages, having three or more delay lines per stage and utilizing switched-line selection of the delay lines at each stage. The preferred embodiment utilizes micro electro mechanical system (MEMS) technology for the switches and delay line networks within each stage, the MEMS switches used to select the desired delay line within each stage.

Figure 3:
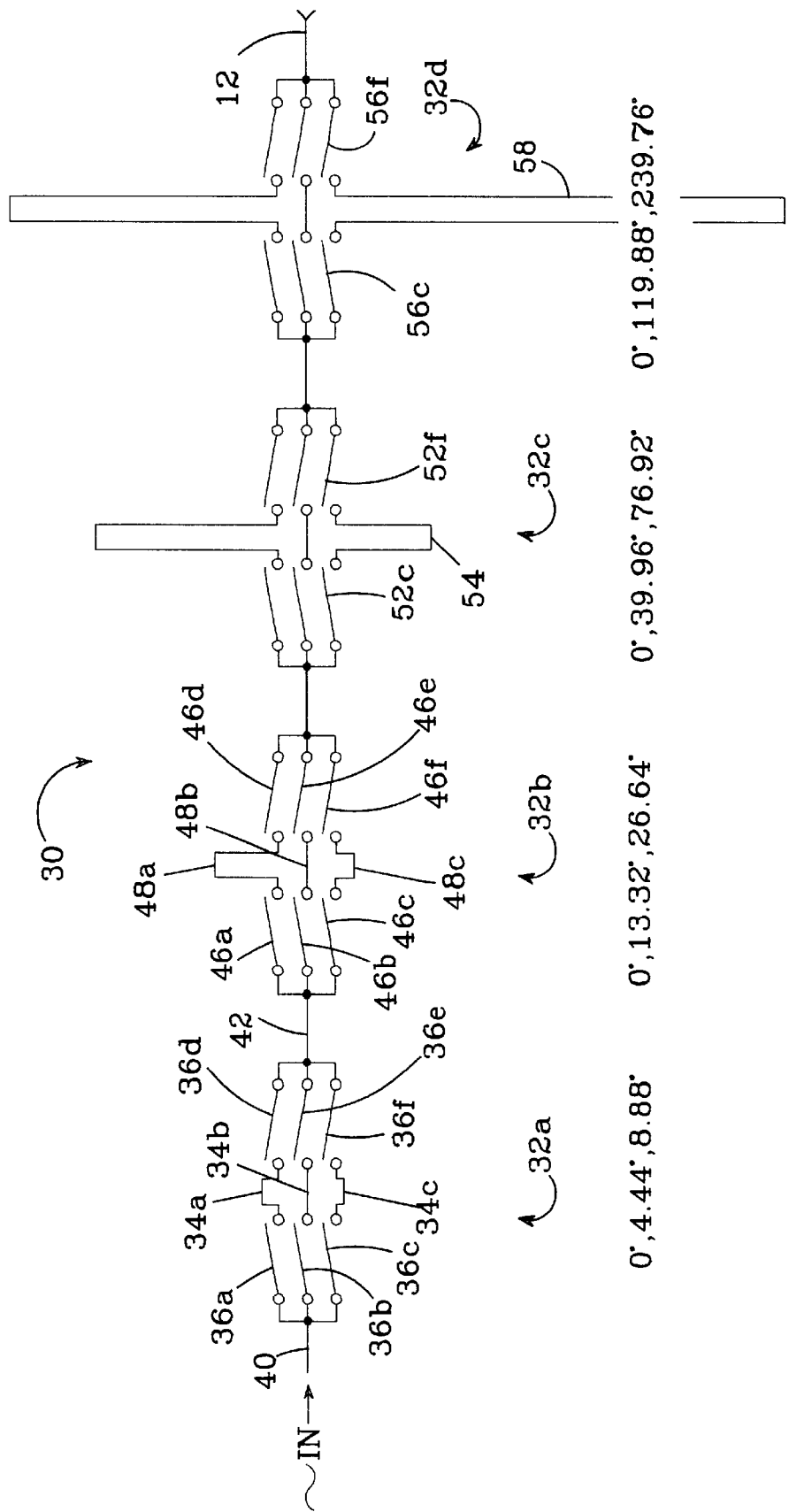
FIG. 3 is a schematic of a switched-line phase shifter in accordance with the present invention using three delay lines per stage.

A preferred embodiment shown in FIG. 3 comprises a phase shifter 30 with four serially coupled time delay stages 32a–32d. Phase shifter 30 accepts a transmission signal on input line 40. This transmission signal is generally the base carrier frequency of the antenna. Transmission of this signal by the antenna without phase shift at the radiating elements would result in a transmission beam down the antenna boresight. To steer the beam, the phase shifters 30 impart phase shifts in the transmission signal at each of the radiating elements.

Input line 40 is coupled to a first time delay stage 32a of phase shifter 30, with three delay lines 34a–34c available within the stage to carry transmission signal from input line 40. Each of three delay lines 34a–34c have different lengths, thereby imparting different time delays to the transmission signal. The time delay is equivalent to the time it takes the transmission signal to transit one of three delay lines 34a–34c. The longer the delay line, the greater the time delay. The phase of the transmission signal is shifted in proportion to the time delay.

One of the three delay lines 34a–34c in the first time delay stage 32a is activated by closing two of six switches 36a–36f to connect the selected transmission into the overall phase sifter 30. Input switches 36a–36c interface between the phase shifter's input line 40 and the inputs to delay lines 34a–34c, respectively, while output switches 36d–36f interface between outputs of delay lines 34a–34c, respectively, and the line 42 that connects the first stage 32a and the second stage 32b. In operation, one of three delay lines 34a–34c is activated by closing the switches at its input and output. The remaining time delay stages 32b, 32c, 32d are constructed and function in a manner similar to the first stage 32a, having the same number of switches and delay lines.

In the example of FIG. 3, the delay lines in the first stage 32a impart respective phase shifts of 0°, 4.44° and 8.88°. The time that it takes the transmission signal to pass through the 4.44° delay line 34c equals the time delay necessary to impart a 4.44° phase shift on the transmission signal. The same is true for the 0° delay line 34b and the 8.88° delay line 34a.

Transmission signal 44 is passed through the first time delay stage 32a along one of three delay line 34a–34c closing the respective input switch 36a–36c and closing the respective output switch 36d–36f. The transmission signal 44, now possessing the phase shift from first time delay stage 32a, is coupled to the second time delay stage 32b along line 42.

In second time delay stage 32b, additional phase shift can be imparted on transmission signal 44 in the same manner a first time delay stage 32a by closing the respective input and output switches within the second stage 32b. After passing through second time delay stage 32b, the signal is coupled to third time delay stage 32c where additional phase shift can be imparted by closing the appropriate switches in the same manner as the two previous time delay stages 32a, 32b. The signal is finally coupled from third time delay stage 32c to fourth time delay stage 32d where additional phase shift can be imparted. From fourth time delay stage 32d, the transmission signal 44, now having the accumulated phase shift of all time delay stages 32a–32d, is coupled to radiating element 12.

The preferred embodiment of the present invention as embodied in FIG. 3, can shift transmission signal with a resolution of 4.44°, shifting transmission signal in increments of 4.44° through the 360° signal cycle. For instance, if a 4.44° phase shift in the transmission signal is desired, switch 36c and switch 36f are closed in first time delay stage 32a and the appropriate switches within time delay stages 32b, 32c, 32d are closed to impart 0° phase shift. After passing through phase shifter 30, transmission signal will experience a 4.44° phase shift.

Figure 4:
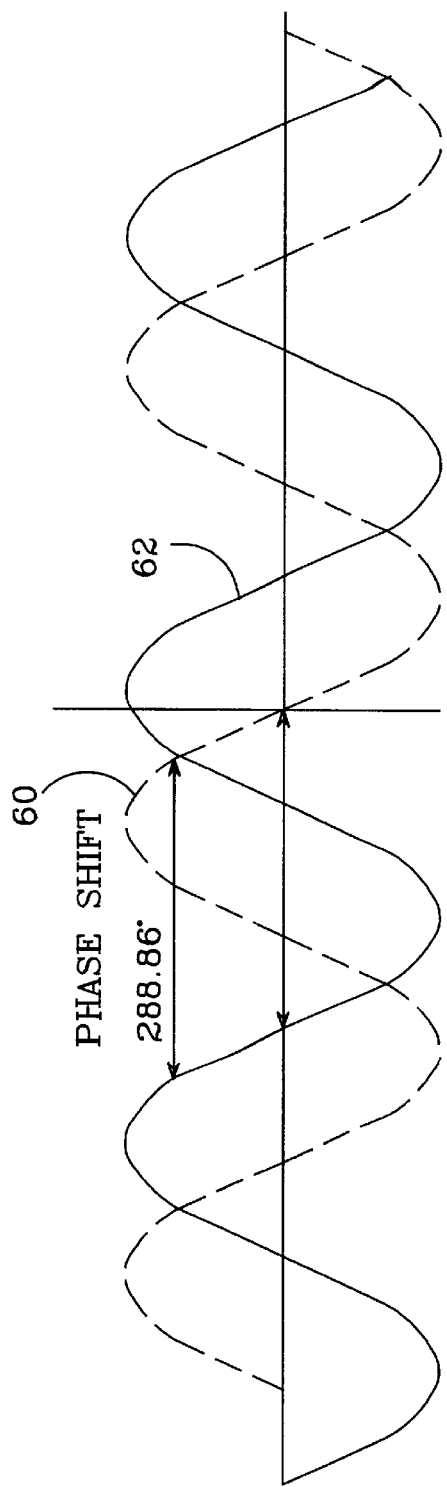
FIG. 4 is a graphical representation of a transmission signal phase shift produced by the circuit of FIG. 3.
Figure 9:
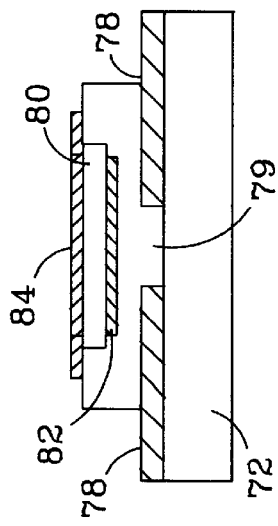
FIG. 9 is a cross section of the switch in FIG. 6 taken along the section line 9—9.
Figure 8:
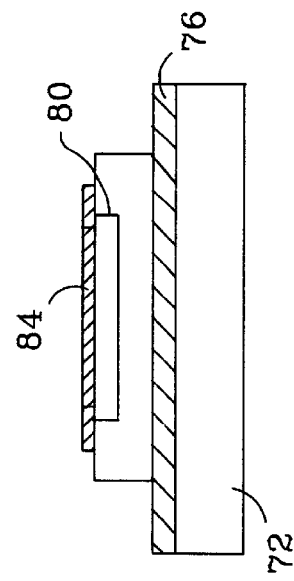
FIG. 8 is a cross section of the switch in FIG. 6 taken along the section line 8—8.

If, as another example, a phase shift of 288.6° is desired, switch 36a and switch 36d in first time delay stage 32a are closed to activate 8.88° phase shift delay line 34a, switch 46b and switch 46b in second time delay stage 32b are closed to activate 0° phase shift delay line 48b, switch 52c and switch 52f in third time delay stage 32c are closed to activate 39.96° phase shift delay line 54, and switch 56c and switch 56f in fourth time delay stage 32d are closed to activate 239.76° delay line 58. After transmission signal passes through phase shifter 30, transmission signal will realize an accumulated phase shift of 288.6°. FIG. 4 illustrates the transmission signal prior to phase shift 60 compared to the transmission signal after experiencing a phase shift of approximately 288.6° 62.

The novel nature of present invention can best be appreciated by comparison to prior art binary phase shifter 20. In the example of FIG. 3 the phase shifter 30 has four stages 32a–32d with 6 switches per stage for a total of 24 switches. In a prior phase shifter 20 in FIG. 2, 24 switches are implemented in six stages 22a–22f with four switches per stage. Accordingly, in a prior phase shifter 20 a transmission signal would pass through six stages and 12 switches experiencing loss and distortion at each switch. In present invention 30, a transmission signal need only encounter four stages and eight switches in passing through the phase shifter. This reduction in the number of stages results in a reduction in signal loss and distortion.

Figure 1:
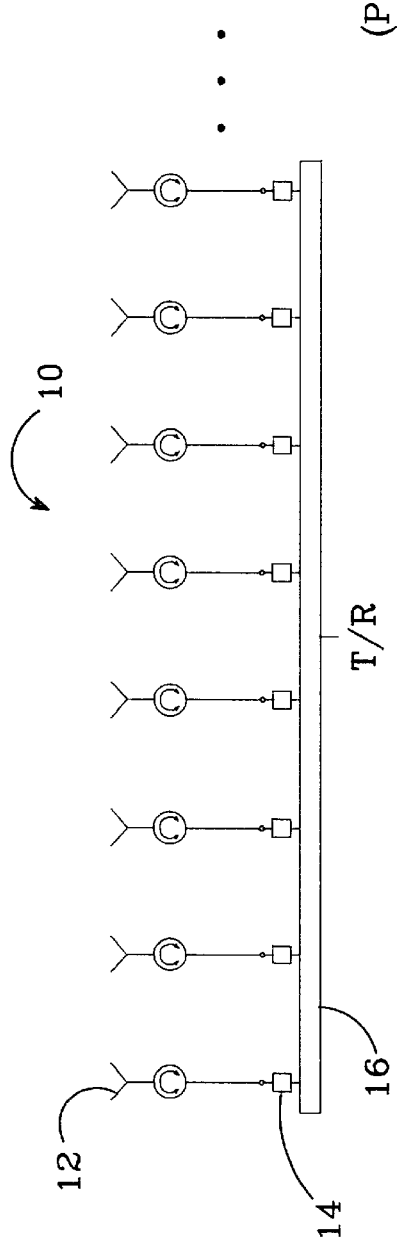
FIG. 1 is a simplified schematic of one row of a known phased array antenna.
Figure 2:
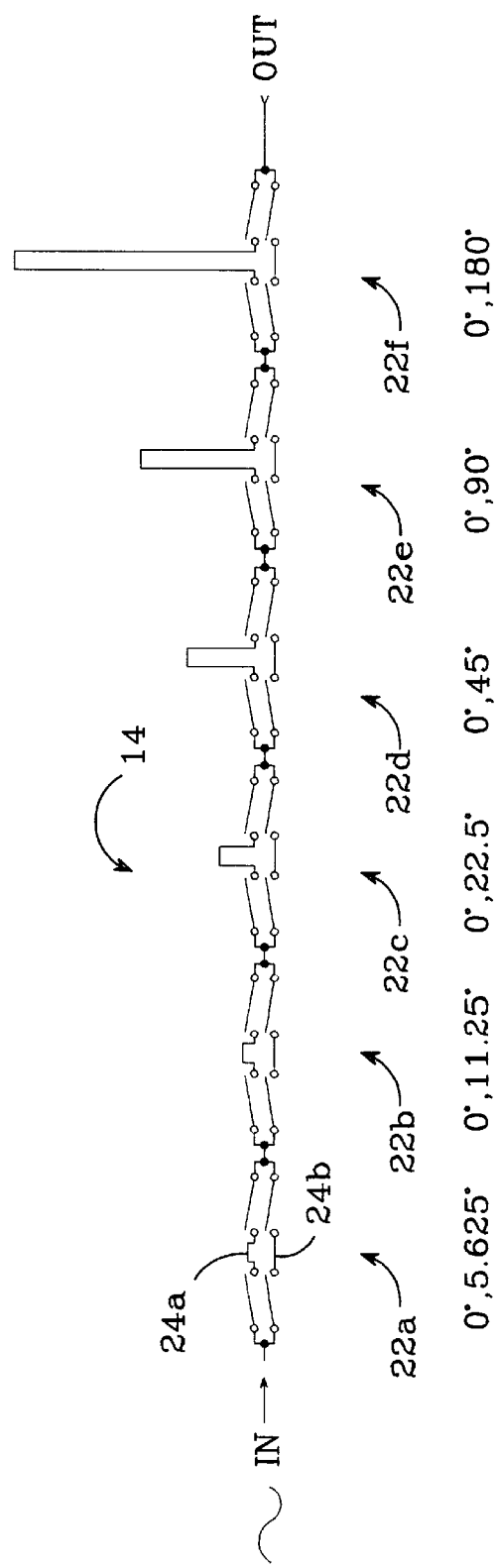
FIG. 2 is a schematic of a prior art switched-line phase shifter used for each radiating element of the antenna shown in FIG. 1.

Further, the present invention realizes a greater beam steering resolution when using the same number of switches and delay lines. The phase shift resolution of prior art 20 shown in FIG. 2, is 5.625° or 64 states through the 360° signal cycle. Present invention 30, using the same number of switches and delay lines, has a phase shifting resolution of 4.44° or 81 states through the 360° signal cycle. This increased resolution is a result of a greater percentage of delay lines that can be dedicated to phase shifting. In the prior art 20, half the delay lines were dedicated to zero phase shift. In the present invention 30, only one third of the delay lines are dedicated to zero phase shift, leaving two-thirds of the delay lines to impart phase shift. This increase in the number of delay lines dedicated to phase shifting results in an increase in phase shifting resolution.

If greater resolution is desired using a base-3 phase shifter, the number of stages can be increased. The preferred embodiment in FIG. 3 utilizes four stages but the improvements over the prior art will be realized regardless of the number of stages. For instance, using prior art binary implementation with nine stages, results in a total of 36 switches, and 512 different phase shifting states. Using the present invention base-3 phase shifter and also using 36 switches results in six stages, and 729 states. Again, with the same number of switches, the resolution is increased while the number of stages is decreased. However, any increase in the number of switches and delay lines can result in significant increase in cost. Thus, a trade-off must be made between phase shifter resolution and phase shifter cost.

Figure 5:
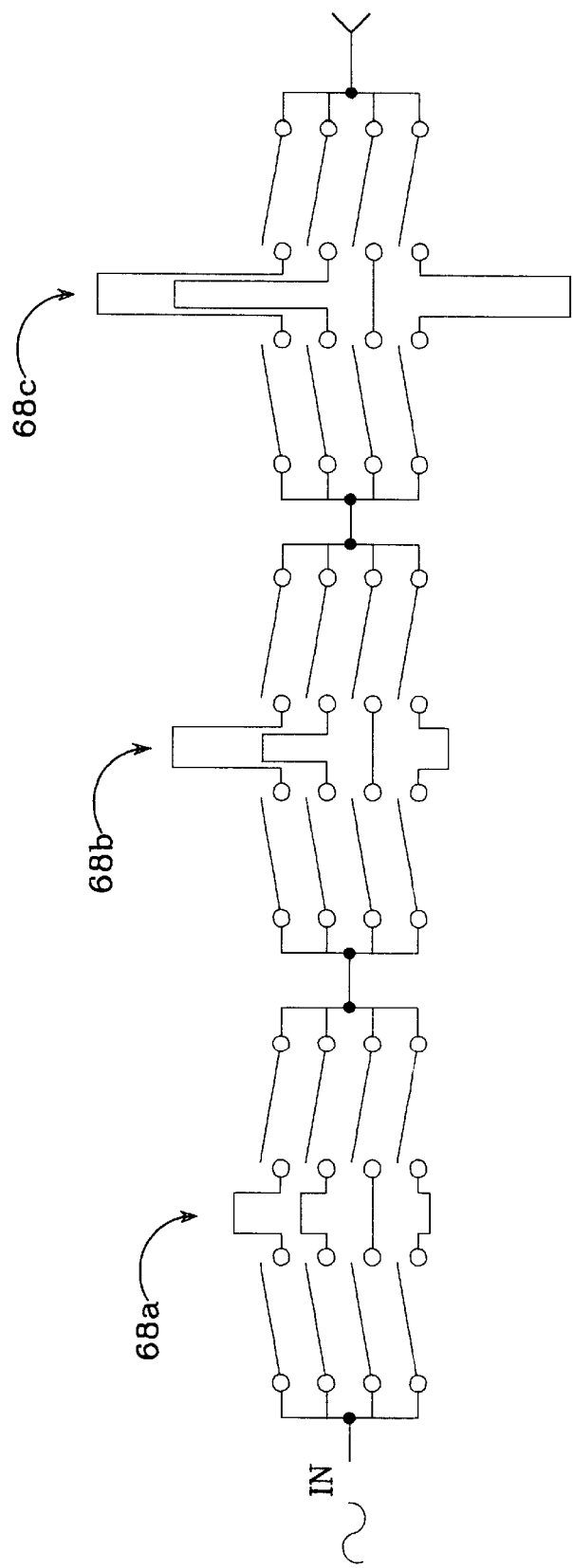
FIG. 5 is a schematic of a switched-line phase shifter in accordance with the present invention using four delay lines per stage.

The number of delay lines per stage can also be increased. FIG. 5. shows the present invention with four delay lines per stage using the same number of switches and transmission lines as FIG. 3, but implemented with three stages 68a–c. The transmission signal only encounters six switches during transmission further reducing insertion loss and distortion. However, the optimal combination of resolution with insertion loss and distortion reduction is realized with the base-3 phase shifter.

Mems Switching Technology

The physical implementation of the delay lines is similar to the delay lines as drawn in FIG. 3 and FIG. 5. The delay lines can be implemented in either microstrip or coplanar waveguide forms (both planar technologies). The delay lines can be folded somewhat for compactness but not so close as to cause interference between the various delay lines.

The switching network in the present invention can be implemented using PIN diode switches or FET switches. However, the preferred embodiment of the present invention uses monolithically integrated switch and delay line circuit and fabrication method using MEMS technology. MEMS switches as described herein are discussed in Yao and Chang, "A Surface Micromachined Miniature Switch For Telecommunication Applications with Signal Frequencies from DC up to 4 Ghz," In Tech. Digest (1995), pp. 384–387 and in U.S. Pat. No. 5,578,976 to Yao, which is assigned to the same assignee as the present application. U.S. Pat. No. 5,578,976 to Yao, also discloses and discusses the design trade-offs in utilizing MEMS technology and the fabrication process for MEMS switches.

In the preferred embodiment shown in FIGS. 6,7,8 and 9, the switches are fabricated on substrate 72 using generally known micro fabrication techniques, such as masking, etching, depositation, and lift-off. Substrate 72 is then encapsulated in an IC package. Alternatively, the present invention can be packaged using a hybrid approach.

Switch 70 is attached to substrate 72 by an anchor structure 74, which may be formed as a mesa on the substrate 72. A bottom electrode 76, typically connected to ground, and a signal line 78 generally comprise microstrips of a metal not easily oxidized, such as gold, for example, deposited on substrate 72. Signal line 78 includes a gap 79 that is opened and closed by operation of the switch as indicated by arrow 71 to activate the selected delay line.

The actuating part of the switch 70 comprises a cantilevered arm 80, typically formed of an insulating material, such as silicon dioxide or silicon nitride. In the preferred embodiment, the cantilever arm 80, as best illustrated in FIG. 6, forms a suspended folded-cantilever beam structure attached at one end to anchor structure 74 that extends over and above bottom electrode 76 and signal line 78 on substrate 72. An electrical contact 82 is positioned on the bottom side of the cantilevered arm 80 so as to face the top of substrate 72 over and above gap 19 and signal line 78.

A top electrode 84, typically comprising a metal such as aluminum or gold, for example, are formed atop cantilever arm 80. Top electrode 84 starts above anchor structure 74 and extends along the top cantilever arm 80 to end at positions above the bottom electrode 76. Cantilever arm 80 and top electrode 84 are broadened above bottom electrode 76 to form a capacitor structure 86. As an option to enhance switch actuation performance, capacitor structure 86 may be formed to include a grid of holes 88 extending through top electrode 84 and cantilever arm 80. The holes typically having dimensions 1–110 μm, for example, reduce structural mass of cantilever arm 80 and the squeeze film dampening effect of air during actuation of switch 70, as indicated by arrow 71.

In operation, each switch 70 is normally in the "Off" position as shown in FIG. 7. With switch 70 in the off-state, signal line 78 is an open circuit due to gap 79 and the separation of electrical contact 82 from signal line 78. Switch 70 is closed to the "On" position by applying a voltage to the top electrode 84. With a voltage on top electrode 84 and capacitor structure 86, which is separated from bottom electrode 76 by insulating cantilever arm 80, electrostatic forces attract capacitor structure 86 (and cantilever arm 80) toward bottom electrode 76. Actuation of cantilever arm 80 toward bottom electrode 76, as indicated by arrow 71, causes contact 82 to come into contact with signal line 78, thereby closing gap 79. This structure provides a very low insertion loss, approximately 0.1 dB at a 4 Ghz signal frequency, and a very high isolation, approximately −50 dB as a switching speed of approximately 1 MHZ and consumes only about 1.4 $\mu$W to switch from the off-state (open circuit) to the on-state (closed circuit) with a closure time on the order of 30 $\mu$s.

While various illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

I claim:

1. A phased array antenna, comprising:
   a transmission signal source comprising a carrier frequency;
   a plurality of radiating elements; and
   a plurality of phase shifters, one of said plurality of phase shifter coupled to one of said plurality of radiating elements, said carrier frequency coupled to said plurality of phase shifters, passing said carrier frequency through said phase shifters and to said radiating elements, each said phase shifter comprising at least one time delay stage connected in series between said input and output to impart a phase on said carrier frequency, each of said time delay stages capable of imparting a selectable one of at least three different respective time delays on said carrier frequency, so as to deliver said carrier frequency to said radiating element with a cumulative time delay determined by the sum of the time delays imparted by said stages, the greater the number of stages, the greater the phase shifting resolution of said phase shifter.

2. The phased array antenna of claim 1, wherein each of said plurality of phase shifters comprises a plurality of serially connected stages, each of said stages comprises at least three delays lines having different respective delay times, and a delay selection network for selecting among said delay lines.

3. The phased array antenna of claim 2, wherein said delay lines of each said stage comprise respective transmission lines of different lengths.

4. The phased array antenna of claim 3, wherein one of said delay lines within each said stage imparts a zero time delay to said transmission signal.

5. The phased array antenna of claim 4, wherein said delay selection network for each said stage comprises a plurality of switches that are selectively operable to include a desired one of said delay lines to an overall transmission path for said transmission signal.

6. The phased array antenna of claim 5, wherein said plurality of switches comprises respective input and output switches for each of said delay lines.

7. The phased array antenna of claim 6, wherein said switches comprises micro electromechanical systems (MEMS) switches.

8. The phased array antenna of claim 7, wherein said input and output lines, delay lines and switches are all formed on a common substrate.

9. The phased array antenna according to claim 2, comprising four time delay stages each having three respective time delays, said delay lines in said first stage imparting respective delays equivalent to phase shifts of 0°, 4.44° and 8.88°, said delays lines in said second stage imparting respective delays equivalent to phase shifts of 0°, 13.32° and 26.64°, said delay lines in said third stage imparting respective delays equivalent to phase shifts of 0°, 39.96° and 79.92°, said delay lines in said fourth stage imparting respective delays equivalent to phase shifts of 0°, 119.88° and 239.76°.

* * * * *